(No Model.)
F. M. HINCHMAN.
GANG PLOW.
No. 359,355. Patented Mar. 15, 1887.
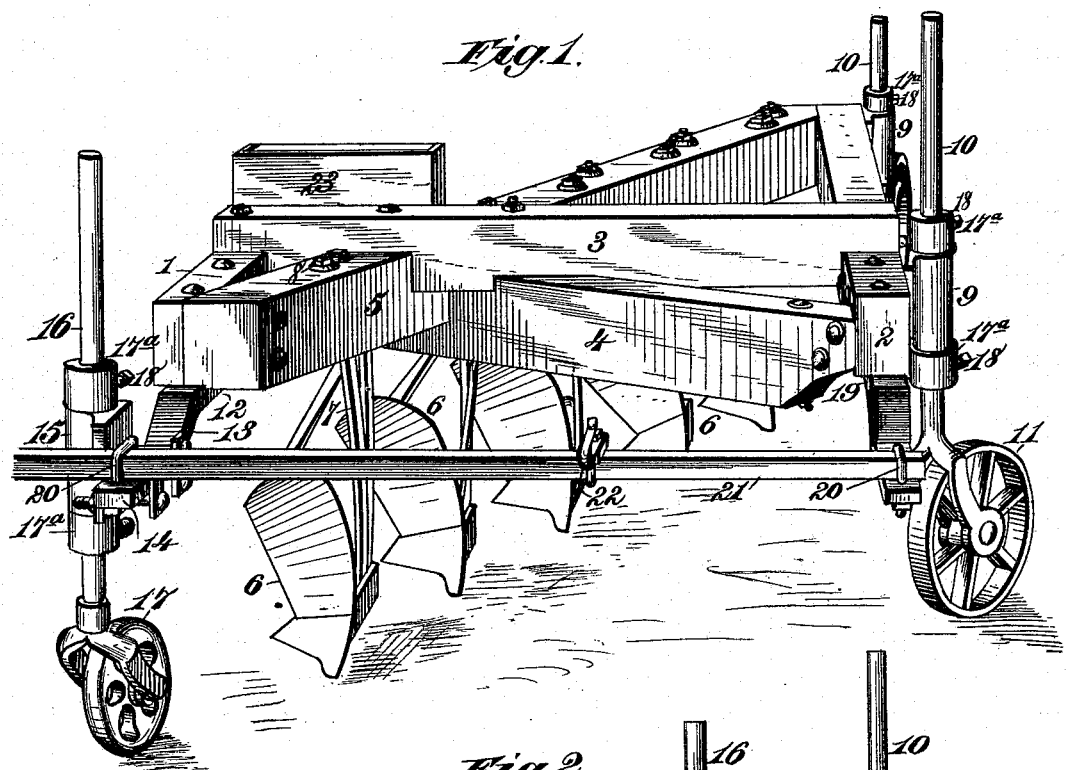
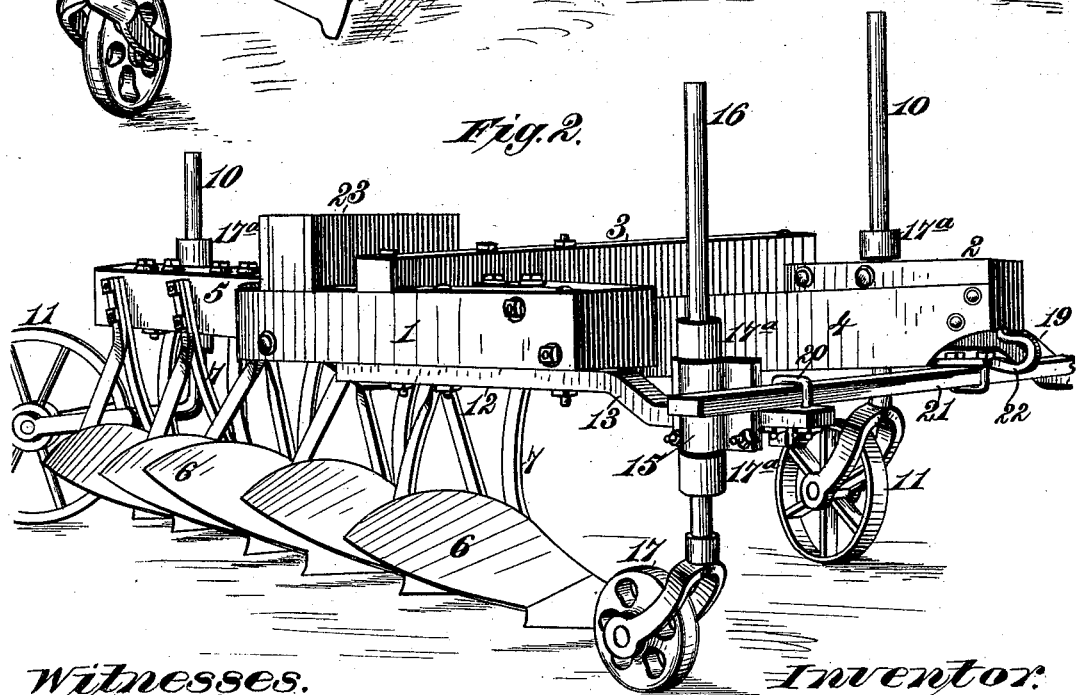
Witnesses.
Robert Everett
Percy B. Hills.
Inventor.
Frank M. Hinchman
By James L. Norris
Atty.

UNITED STATES PATENT OFFICE.

FRANK M. HINCHMAN, OF WACO, TEXAS.

GANG-PLOW.

SPECIFICATION forming part of Letters Patent No. 359,355, dated March 15, 1887.

Application filed November 23, 1886. Serial No. 219,665. (No model.)

*To all whom it may concern:*

Be it known that I, FRANK M. HINCHMAN, a citizen of the United States, residing at Waco, in the county of McLennan and State of Texas, have invented new and useful Improvements in Gang-Plows, of which the following is a specification.

This invention has for its objects to provide a novel and substantial gang-plow for breaking up the soil and making it loose and mellow to any depth desired; to provide novel caster-wheel supports for the plow-frame, which will freely assume the position required according to the line of draft of the team, and on which the plow-frame is vertically adjustable for breaking up the soil to more or less depth, and to provide a novel plow-frame whereby the plows can be hung from one beam and occupy a position obliquely to the line of draft. These objects I accomplish in the manner and by the construction and combination of devices hereinafter described and claimed, reference being made to the accompanying drawings, in which—

Figure 1 is a perspective view of a gang-plow embodying my invention and looking at the front of the frame, and Fig. 2 a perspective view looking at the left-hand side of Fig. 1.

In order to enable those skilled in the art to make and use my invention, I will now describe the same in detail, referring to the drawings, where the numerals 1 and 2 indicate two parallel side beams, the one 2 being at the landside and extending the full length of the frame. A cross-beam, 3, is bolted to the forward end portions of the side beams and serves to rigidly connect the same, and a diagonal beam, 4, connects the front end of the landside-beam 2 with the rear end of the short side beam, 1. An oblique plow-carrying beam, 5, connects at its rear end with the rear end of the landside-beam 2, and at its front end connects with the cross-beam 3 and the front end of the short beam 1, the arrangement being such that the plows 6, connected with the beam 5 along its length, occupy a line obliquely to the line of draft.

The plows may be of any proper construction suitable for the conditions required to plow the soil, and any desired number of plows may be employed.

I have shown five plows having their standards 7 extending vertically through the oblique beam 5 and secured by nuts and washers 8; but I do not confine myself to this particular means of attaching the plows to the oblique plow-beam. To the side of the rear and front ends, respectively, of the landside-beam 2 are bolted two vertically-arranged tubular bearings or boxings, 9, through which extend the two cylindrical rods 10, carrying wheels 11 at their lower ends. As the rods can freely rotate in the bearings or boxings, the wheels become caster-wheels, and, accordingly, can freely assume the position required to follow the line of draft.

To the forward ends of the side beam, 1, and oblique plow-beam, 5, is attached a metallic bar, 12, having its outer end downwardly curved, as at 13, and then extended horizontally, as at 14, and to the horizontal part of the bar is secured a vertically-arranged tubular bearing or boxing, 15, through which extends a cylindrical rod, 16, carrying a wheel, 17, at its lower end. As in the instance of the other rods, 10, this rod 16 can freely rotate in its bearing or boxing, and therefore its wheel becomes a caster-wheel, which accommodates itself to the line of draft. On each of the cylindrical rods, and arranged, respectively, above and below the tubular bearings or boxings, are mounted two collars, $17^a$, adapted to slide along the rods and to be held stationary in their adjusted position by means of screw-bolts 18, tapped through the collars to bind against the rods. By this means the entire frame, with the plows, can be raised or lowered on the rods to loosen or plow the soil to more or less depth; and, further, by the construction set forth the frame and plows can be raised sufficiently to provide for the transportation of the structure from place to place without the plows encountering the earth.

To the front end of the landside-beam is secured a metallic bar, 19, bent downward and then horizontally, and to this bar and the bar 12 is secured, by clips 20, the transverse draft-bar 21, having a draft-hook, 22, or other device, to which the team is hitched. In the traveling movement of the structure the rear caster-wheel acts as a trailer; but all the wheels, being casters, can freely conform to the line of draft.

A box, 23, may be located on the frame to serve as a receptacle for tools, implements, or other purposes. The beams comprising the frame are mortised together and secured by bolts and nuts in any appropriate manner.

The construction of the plows will be such as to meet the conditions required for black or sandy land. The wheel 17 constitutes a rolling colter.

I purpose using a seeder, located at the right-hand side of the plow-frame in advance of the plows.

I am aware of Letters Patent Nos. 331,503 and 283,394, and do not wish to be understood as broadly claiming what is therein disclosed.

Having thus described my invention, what I claim is—

1. The combination, in a gang-plow, of the landside-beam 2, the front cross-beam, 3, the oblique plow-carrying beam 5, connected at its rear end to the landside-beam and at its front to the front cross-beam, the tubular bearings or boxings on the side of the landside-beam and at the front of the plow-beam, the wheeled cylindrical rods 10, extending through and freely rotatable in the said bearings or boxings, and means, substantially as described, for raising and lowering the frame on the cylindrical rods.

2. The combination, in a gang-plow, of the landside-beam 2, the front cross-beam, 3, the oblique plow-carrying beam 5, the downwardly-curved bars 12 and 19, having horizontal portions 14 and attached, respectively, to the forward ends of the oblique plow-beam and the landside-beam, the transverse draft-bar 21, secured to the horizontal parts of the curved bars, the two tubular boxings secured to the landside-beam, the tubular boxing secured to the curved bar extending from the plow-beam, the wheeled cylindrical rods extending through and freely rotatable axially in the tubular boxings, and collars and screw-bolts vertically adjustable on the cylindrical rods to raise and lower the beams, substantially as described.

In testimony whereof I affix my signature in presence of two witnesses.

FRANK M. HINCHMAN.

Witnesses:
JONEY JONES,
C. H. SCOVILLE.